Patented Oct. 2, 1934

1,975,211

UNITED STATES PATENT OFFICE 1,975,211

DRYING OIL AND METHOD OF PRODUCING IT

Alan C. Johnston, Wilmington, Del., assignor to Hercules Powder Company, Wilmington, Del., a corporation of Delaware No Drawing. Application September 16, 1931 Serial No. 563,225

19 Claims. (Cl. 202—3)

This invention relates to a method of producing a rosin product and more particularly relates to the production of a neutral oil adaptable for use as a drying oil, and of noncrystallizing rosin or resinous material.

Heretofore it has been known that rosin oil can be formed by heating abietic acid or rosin, as for example, gum rosin or wood rosin, in the presence of various substances, which apparently act catalytically, such as inorganic acids, as sulphuric, phosphoric, boric, etc. or as anhydrous metallic chlorides, as zinc chloride, ferric chloride, etc., or as a metal, such as iron, the rosin oil formed being distilled off.

The methods heretofore known for the production of rosin oil have not, however, proved entirely satisfactory for various reasons among which may be mentioned the difficulty of obtaining a substantially neutral rosin oil, the difficulty of obtaining a rosin oil free from a low boiling end, unsatisfactory color and odor of the oil, etc., etc., low yield, dark color of distillation residue.

Now in accordance with this invention it has been found that a substantially neutral drying oil of desirable color and substantially free from a low boiling end, and practically free from the characteristic odor of the rosin oil of commerce, may be produced by heating abietic acid or rosin, as wood or gum rosin, in the presence of an aromatic sulphonic acid, as for example, para-toluene sulphonic acid, benzene sulphonic acid, naphthalene sulphonic acid, sulfo-salicilic acid etc. The drying oil product of the method in accordance with this invention will be found to possess superior drying properties in that it will more readily form a film on exposure to air than will rosin oils heretofore known and, at the same time, in its production a non-crystallizing resinous material will be obtained, which will be found to be highly desirable for use in the arts where a non-crystallizing rosin is desired, as for example, in core oils. The resinous material may be used as such or in admixture with wood or gum rosin.

In carrying this invention into practice the aromatic sulphonic acid, which is believed to act catalytically, may be used in varying amounts, desirably say in amount within about the range 0.05%–1.0%, by weight of the rosin treated. For all practical purposes about 0.1% of aromatic sulphonic acid will be found sufficient. In carrying out the method the rosin may be treated at a temperature say within about 200° C.–300° C. under atmospheric pressure and distilling off of the oil may be desirably effected at a temperature within about the range 200° C.–250° C. and under a reduced pressure say within about the range 2–15 mm. mercury.

The period of treatment for the formation of drying oil and resinous material in accordance with this invention will vary depending upon the temperature and amount of aromatic sulphonic acid used, by way of illustration, however, using, for example, 1 part of para-toluene sulphonic acid to 1000 parts of rosin and heating to a temperature of about 200° C. under atmospheric pressure, the drying oil will be formed and may be distilled off after a period of about one-half hour. As illustrative of the practical adaptation of the method embodying this invention, for example, 1000 parts of wood rosin grading I in color, are melted by heating to say about 200° C. To the melted rosin about 1 part (0.1%) of para-toluene sulphonic acid is added and the temperature held for about one-half hour. After about one-half hour the temperature is rapidly raised to about 300° C. then decreased to 250° C. and the pressure reduced to about 2–15 mm. mercury. The drying oil formed will distill over at this temperature under the reduced pressure with a yield of about 650 parts of drying oil A. N. 6. If desired, the para-toluene sulphonic acid may be added before the rosin is melted, it being understood that the time of addition of the aromatic sulphonic acid is immaterial, so long as the rosin is heated at a suitable temperature for a suitable time in the presence thereof.

The drying oil produced as indicated above may be refined and rendered substantially neutral, if desired, by redistillation from a small amount of fixed alkali, as soda ash or the like. The refined drying oil will have an acid number of about 0.5, a refractive index of about 1.530 at 20° C., specific gravity of about 0.967 at 15° C., boiling point of about 190–5° C. under a pressure of 5 mm. mercury boiling range about 340–360° C. under atmospheric pressure and an iodine value of about 230–260. The product will be found to possess the characteristics of a drying oil to a superior degree.

The residue remaining after the distillation off of the drying oil constituting a rosin or resinous product will be found to have an acid number of around 100 and a melting point of about 70° C.–120° C. depending upon the conditions of the reaction for formation of the drying oil. The rosin or resinous product will, as has been indicated, be found to be non-crystallizing and will be adaptable for use as such or in admixture with wood or gum rosin for various purposes, such as core oils, etc., etc.

If desired the unreacted resin acid remaining in the residue after distillation off of the drying oil may be distilled off by distillation under reduced pressure. For example, the resin acid may be distilled off from the residue, after distillation off of the drying oil, by continuing the heating up to a temperature of 300° C. under a reduced pressure, say under a pressure of 2-15 mm. mercury. By distillation off of a resin acid a pale colored resinous mass having a melting point of 100° C.-150° C. and an acid number of 20-50 will be obtained as residue. The resinous mass obtained after distillation off of resin acid will be found to be non-crystallizing and may be used as such or admixed with either wood or gum rosin variously in the arts, as for example, in core oils.

It will be understood that the method in accordance with this invention for the production of drying oil and non-crystallizing resinous material is adaptable to the treatment of various grades of wood rosin, gum rosin, abietic acid, etc. and that the yields of drying oil and amounts and character of the residues will depend upon the particular rosin subjected to treatment and the particular conditions of treatment which may be varied within relatively wide limits, it being understood that the essence of this invention resides in the treatment of the rosin in the presence of an aromatic sulphonic acid. It will be further understood that where in the claims appended hereto I use the term rosin, I intend to include wood and gum rosin and abietic acid as equivalents.

What I claim and desire to protect by Letters Patent is:

1. The method of producing a rosin product which includes heating rosin to a temperature within about the range 250° C.-300° C. in the presence of an aromatic sulphonic acid.

2. The method of producing a rosin product which includes heating rosin to a temperature within about the range 250° C.-300° C. in the presence of an aromatic sulphonic acid in amount of 0.05%-1.0% by weight of the rosin.

3. The method of producing a rosin product which includes heating rosin to a temperature within about the range 250° C.-300° C. in the presence of an aromatic sulphonic acid and distilling off drying oil.

4. The method of producing a rosin product which includes heating rosin to a temperature within about the range 250° C.-300° C. in the presence of an aromatic sulphonic acid in amount of 0.05%-1.0% by weight of the rosin and distilling off drying oil.

5. The method of producing a rosin product which includes heating rosin to a temperature within about the range 250° C.-300° C. in the presence of an aromatic sulphonic acid and distilling off drying oil under reduced pressure.

6. The method of producing a rosin product which includes heating rosin to a temperature within about the range 250° C.-300° C. in the presence of an aromatic sulphonic acid, distilling off drying oil under reduced pressure and finally distilling off unreacted resin acid.

7. The method of producing a non-crystallizing resinous material which includes heating rosin to a temperature within about the range 250° C.-300° C. in the presence of an aromatic sulphonic acid and distilling off drying oil.

8. The method of producing a non-crystallizing resinous material which includes heating rosin to a temperature within about the range 250° C.-300° C. in the presence of an aromatic sulphonic acid, distilling off drying oil and then distilling off resin acid.

9. The method of producing a rosin product which includes heating rosin to a temperature within about the range 250° C.-300° C. in the presence of para-toluene sulphonic acid and distilling off drying oil.

10. A substantially neutral oil obtained by distillation from the reaction products of the reaction of rosin with an aromatic sulphonic acid in the presence of heat, the oil being characterized by a specific gravity of about 0.967, at 15° C., a refractive index of about 1.530 at 20° C., a boiling range under atmospheric pressure of about 340-360° C. and an iodin value of about 230-260.

11. The method of producing a rosin product which includes heating rosin to a temperature within about the range 250° C.-300° C. in the presence of an aromatic sulphonic acid, distilling off drying oil, adding an alkali to the drying oil, redistilling the drying oil, and collecting the fraction boiling within about the range 340° C.-360° C. at normal atmospheric pressure.

12. The method of producing a rosin product which includes heating rosin to a temperature within about the range 250° C.-300° C. in the presence of a toluene sulphonic acid, and distilling off drying oil.

13. The method of producing a rosin product which includes heating rosin to a temperature within about the range 250° C.-300° C. in the presence of benzene sulphonic acid, and distilling off drying oil.

14. The method of producing a rosin product which includes heating rosin to a temperature within about the range 250° C.-300° C. in the presence of a toluene sulphonic acid in amount of 0.05%-1.0% by weight of the rosin, and distilling off drying oil.

15. The method of producing a rosin product which includes heating rosin to a temperature within about the range 250° C.-300° C. in the presence of benzene sulphonic acid in amount of 0.05%-1.0% by weight of the rosin, and distilling off drying oil.

16. The method of producing a rosin product which includes heating rosin to a temperature within about the range 250° C.-300° C. in the presence of p-toluene sulphonic acid in amount of 0.05%-1.0% by weight of the rosin, and distilling off drying oil.

17. The method of producing a non-crystallizing resinous material which includes heating rosin to a temperature within about the range 250° C.-300° C. in the presence of a toluene sulphonic acid, and distilling off drying oil and unreacted resin acid.

18. The method of producing a non-crystallizing resinous material which includes heating rosin to a temperature within about the range 250° C.-300° C. in the presence of benzene sulphonic acid, and distilling off drying oil and unreacted resin acid.

19. The method of producing a non-crystallizing resinous material which includes heating rosin to a temperature within about the range 250° C.-300° C. in the presence of p-toluene sulphonic acid, and distilling off drying oil and unreacted resin acid.

ALAN C. JOHNSTON.